US012767449B2

(12) United States Patent
Cisamolo

(10) Patent No.: US 12,767,449 B2
(45) Date of Patent: Oct. 20, 2026

(54) DEVICE FOR CONVEYING AND FEEDING CONTAINERS FOR MACHINES FOR PROCESSING CONTAINERS

(71) Applicant: P.E. LABELLERS S.P.A., Porto Mantovano (IT)

(72) Inventor: Omar Cisamolo, Marmirolo (IT)

(73) Assignee: P.E. Labellers S.P.A., Porto Mantovano (IT)

( * ) Notice: Subject to any disclaimer, the term of this patent is extended or adjusted under 35 U.S.C. 154(b) by 97 days.

(21) Appl. No.: 18/874,488

(22) PCT Filed: Jun. 7, 2023

(86) PCT No.: PCT/EP2023/065300
§ 371 (c)(1),
(2) Date: Dec. 12, 2024

(87) PCT Pub. No.: WO2024/002650
PCT Pub. Date: Jan. 4, 2024

(65) Prior Publication Data

US 2025/0353688 A1 Nov. 20, 2025

(30) Foreign Application Priority Data

Jun. 28, 2022 (IT) ........................ 102022000013597

(51) Int. Cl.
*B65G 33/04* (2006.01)
*B65C 9/04* (2006.01)
(Continued)

(52) U.S. Cl.
CPC ........... *B65G 33/04* (2013.01); *B65G 33/265* (2013.01); *B65G 47/28* (2013.01); *B65C 9/04* (2013.01);
(Continued)

(58) Field of Classification Search
CPC ...... B65G 33/04; B65G 33/265; B65G 47/28; B65G 47/29; B65G 2201/0235;
(Continued)

(56) References Cited

U.S. PATENT DOCUMENTS 2,259,748 A * 10/1941 Hullhorst ............... B65G 33/04
53/367
2,630,904 A 3/1953 Bozek
(Continued)

FOREIGN PATENT DOCUMENTS

DE 2342252 A * 2/1975
EP 0 127 584 A1 12/1984
(Continued)

OTHER PUBLICATIONS

European Patent Office, International Search Report and Written Opinion issued Feb. 1, 2023, which pertains to PCT Application No. PCT/EP2023/065300. 11 pgs.

*Primary Examiner* — Mark A Deuble
(74) *Attorney, Agent, or Firm* — THOMPSON HINE LLP

(57) ABSTRACT

A device for conveying and feeding containers, for machines for processing containers, which device includes a conveyor for movement of containers along an advancement direction, and separation system, which is adapted to mutually space apart the containers along the advancement direction. The separation system includes a screw feeder and at least one abutment wall, which is arranged so as to face to the lateral surface of the screw feeder. The screw feeder has, along its longitudinal extension, proceeding from one of its ends to the other end in the same direction as the advancement direction of the containers, three regions that can be engaged in sequence by the containers, respectively at least one access region for the containers, at least one accommodation region, which is adapted to receive one container at a time
(Continued)

from the access region, and an acceleration region for accelerating the containers.

9 Claims, 4 Drawing Sheets

(51) Int. Cl.
*B65G 33/26* (2006.01)
*B65G 47/28* (2006.01)

(52) U.S. Cl.
CPC ................ *B65G 2201/0235* (2013.01); *B65G 2812/0527* (2013.01)

(58) Field of Classification Search
CPC ........ B65G 2812/0527; B65G 47/8861; B65C 9/04; B65B 35/26
USPC ........ 198/657, 661, 662, 663, 666, 670, 676
See application file for complete search history.

(56) References Cited

U.S. PATENT DOCUMENTS

| | | | | | |
|---|---|---|---|---|---|
| 2,781,122 | A * | 2/1957 | Gueffroy | B65B 43/52 | 198/534 |
| 2,829,757 | A * | 4/1958 | Breeback | B65G 47/681 | 198/612 |
| 3,026,991 | A * | 3/1962 | Kinsley | B65G 33/04 | 198/459.4 |
| 3,841,946 | A * | 10/1974 | Carter | B65C 9/06 | 156/566 |
| 4,265,357 | A * | 5/1981 | Amberg | B65G 47/28 | 198/572 |
| 4,969,348 | A * | 11/1990 | Clowes | B65G 33/06 | 72/425 |
| 5,107,980 | A * | 4/1992 | Piazza | B65G 33/04 | 198/676 |
| 5,697,489 | A * | 12/1997 | Deonarine | B65G 43/08 | 198/464.4 |
| 6,386,353 | B1 * | 5/2002 | Gerber | B65G 47/28 | 198/660 |
| 7,284,577 | B2 * | 10/2007 | Yoneda | B65G 47/28 | 141/144 |

FOREIGN PATENT DOCUMENTS

| | | | | |
|---|---|---|---|---|
| JP | 59-12012 | U | | 1/1984 |
| JP | 05-32324 | U | | 4/1993 |
| JP | H05-23234 | | * | 4/1993 |

* cited by examiner

DEVICE FOR CONVEYING AND FEEDING CONTAINERS FOR MACHINES FOR PROCESSING CONTAINERS

The present invention relates to a device for conveying and feeding containers for machines for processing containers.

As is known, in machines for processing containers, such as for example labeling machines, a conveyor for the containers is provided, which usually comprises a rotating carousel, around which one or more labeling stations are arranged, and which has, along its peripheral region, a plurality of pans, angularly mutually spaced apart, which are designed to receive a respective container in resting contact thereon and which can be moved in rotation in order to make the containers rotate about their axes.

Typically, containers are fed in input to the carousel by a linear conveyor, along which there are separation means which space the containers apart from each other along the direction for feeding them, so as to place them in step with the pans of the carousel.

Currently, in order to separate and give a rhythm/cadence to the feed of containers of polyhedral shape and, in particular, contoured containers with flat faces, with a polygonal cross-section, for example square or rectangular, and sharp corner edges or rounded edges with small radii of curvature, two mutually opposite screw feeders are used, which slightly rotate each container that arrives, in the succession of containers, in so doing creating a space between one container and the next.

This solution presents some drawbacks.

In fact the use of two screw feeders entails a considerable cost since the machine needs to be fitted with the associated movement supports.

Furthermore, providing a machine with two screw feeders is often disadvantageous from the commercial point of view, in that the use of the second screw feeder may be superfluous with some container formats that the machine may be called on to process, and in any case it requires special tools, for adapting the machine to new container formats, to be always available for both screw feeders, even if they are not necessary in all cases.

Finally it should be noted that the double screw feeder solution may not be efficient in operation, in particular if the adjustments and the geometric dimensions of the screw feeders do not allow the containers to be inclined and handled in the necessary spaces.

The aim of the present invention is to provide a device for conveying and feeding containers for machines for processing containers that is capable of improving the known art in one or more of the above-mentioned aspects.

Within this aim, an object of the invention is to provide a device for conveying and feeding containers for machines for processing containers that is capable of positively operating with contoured containers that have sharp corner edges, without the need for a screw feeder arranged opposite.

Another object of the invention is to provide a device for conveying and feeding containers that is capable of handling containers of different formats that are square or rectangular in cross-section, without the need for adapted screw feeders for each format.

Another object of the invention is to provide a device for conveying and feeding containers that can validly be applied in low-speed production.

Another object of the invention is to provide a device for conveying and feeding containers that is structurally simpler if compared to the devices of the known art.

Another object of the invention is to provide a device for conveying and feeding containers that is reliable and safe in operation.

Furthermore, the present invention sets out to overcome the drawbacks of the background art in a manner that is alternative to any existing solutions.

Another object of the invention is to provide a device for conveying and feeding containers that, owing to its peculiar implementation characteristics, can be produced at low cost.

This aim and these and other objects which will become better apparent hereinafter are achieved by a device for conveying and feeding containers for machines for processing containers according to claim 1, optionally provided with one or more of the characteristics of the dependent claims.

Further characteristics and advantages of the invention will become better apparent from the detailed description that follows of a preferred, but not exclusive, embodiment of the device for conveying and feeding containers for machines for processing containers according to the invention, which is illustrated for the purposes of non-limiting example in the accompanying drawings wherein.

Figures 1, 2:
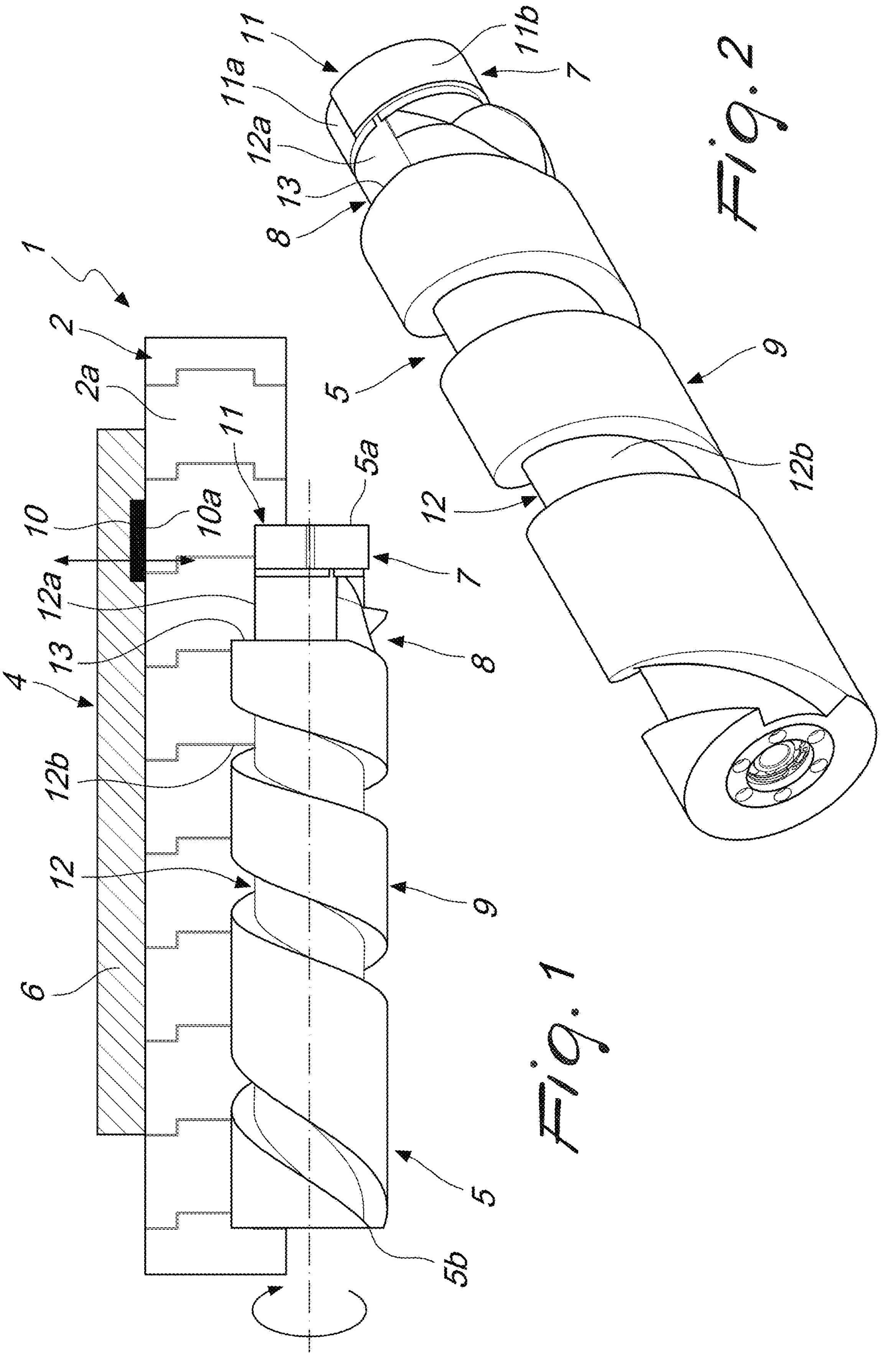
FIG. 1 is a plan view from above of the device according to the invention.
FIG. 2 is a perspective view of the screw feeder of the device according to the invention.
Figure 4:
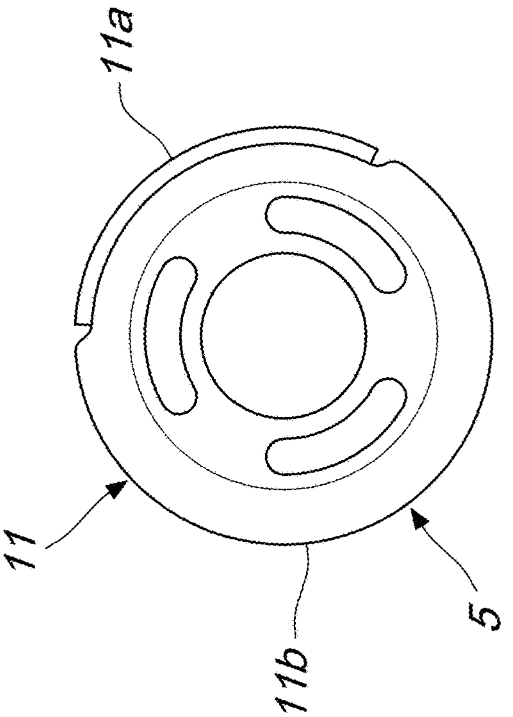
FIG. 4 is a front elevation view of an end of the screw feeder of the device according to the invention.
Figure 3:
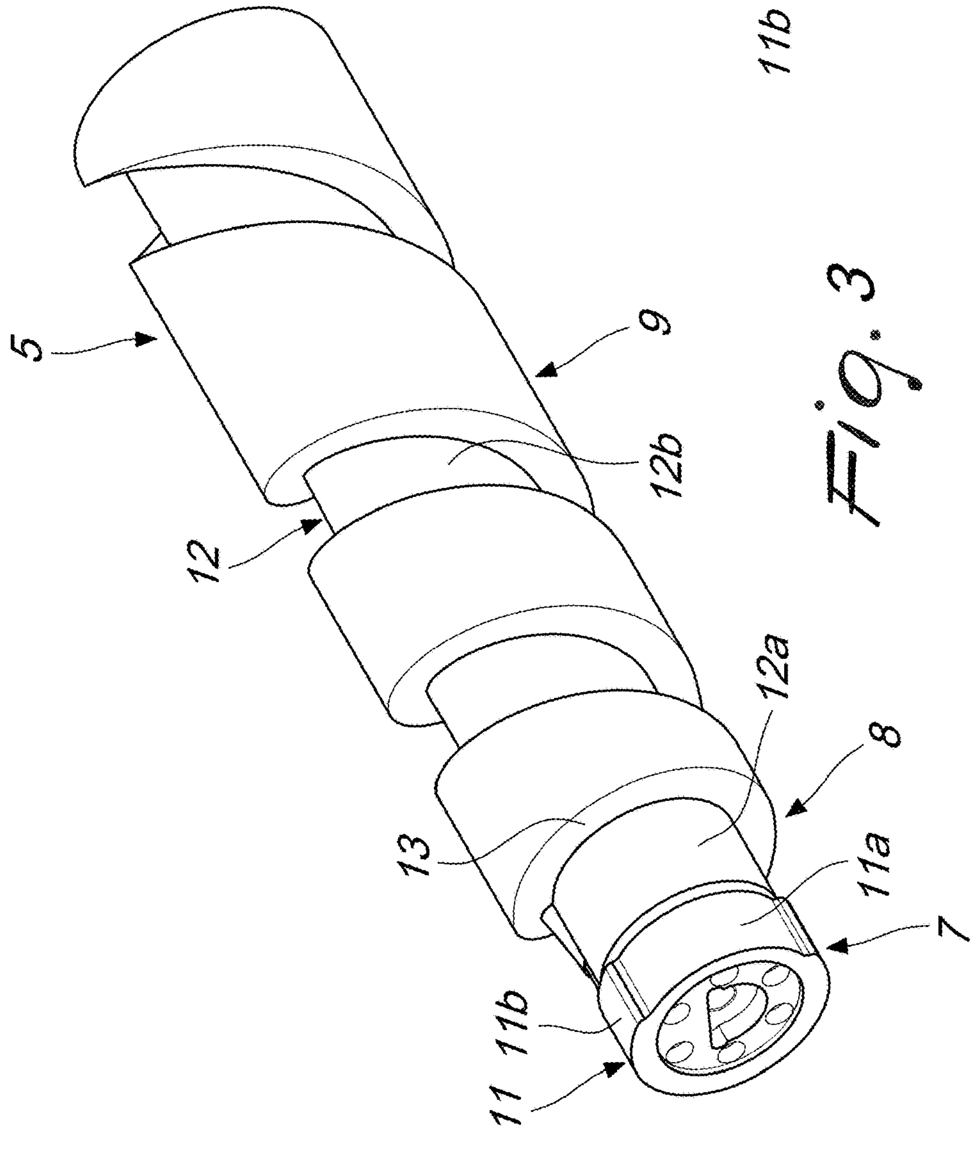
FIG. 3 is a perspective view of the screw feeder from a different angle.

With reference to the figures, the device for conveying and feeding containers for machines for processing containers according to the invention, generally designated by the reference numeral 1, comprises a conveyor 2 that makes it possible to move, along an advancement direction 100, containers **3*a*, 3*b*, 3*c*, 3*d*, 3*e***, arranged in succession, which have, in particular, a shaping with substantially flat faces and with a substantially polygonal transverse cross-section, for example square or rectangular.

Conveniently, the conveyor 2 is provided with a movable upper surface **2*a*** for supporting the containers, on which the containers are arranged to rest thereon with their bases.

For example, the conveyor 2 can be constituted by a moving mat, a conveyor belt or the like.

The device according to the invention further comprises separation means 4, the function of which is to mutually space the containers **3*a*, 3*b*, 3*c*, 3*d*, 3*e* apart along the advancement direction 100, while these are advancing on the conveyor 2**.

According to the invention, the separation means 4 comprise a screw feeder 5, which is arranged, with its axis, substantially parallel to the advancement direction 100 of the containers and which can be actuated to rotate about its own axis, at a preset angular speed, using drive means (not shown).

The separation means 4 further comprise at least one abutment wall or bank 6, which is arranged so as to face the lateral surface of the screw feeder 5, so that the containers in transit on the conveyor 2 must necessarily pass between the screw feeder 5 and the abutment wall 6.

Conveniently, there are means for adjusting the distance between the screw feeder 5 and the abutment wall 6, which make it possible, in particular, to vary the position of the abutment wall 6, with respect to the screw feeder 5, on the basis of the dimensions and/or the shape of the containers.

Also according to the invention, the screw feeder 5 has, along its longitudinal extension, proceeding in particular from its end 5*a*, which is encountered first by the containers arriving on the conveyor 2, toward its other end 5*b*, in the same direction as the advancement direction 100 of the containers, at least three separate regions, which can be engaged in sequence by the containers that transit on the conveyor 2 and which are, in particular, constituted by at least one access region 7, at least one accommodation region 8, and at least one acceleration region 9.

Figure 5:
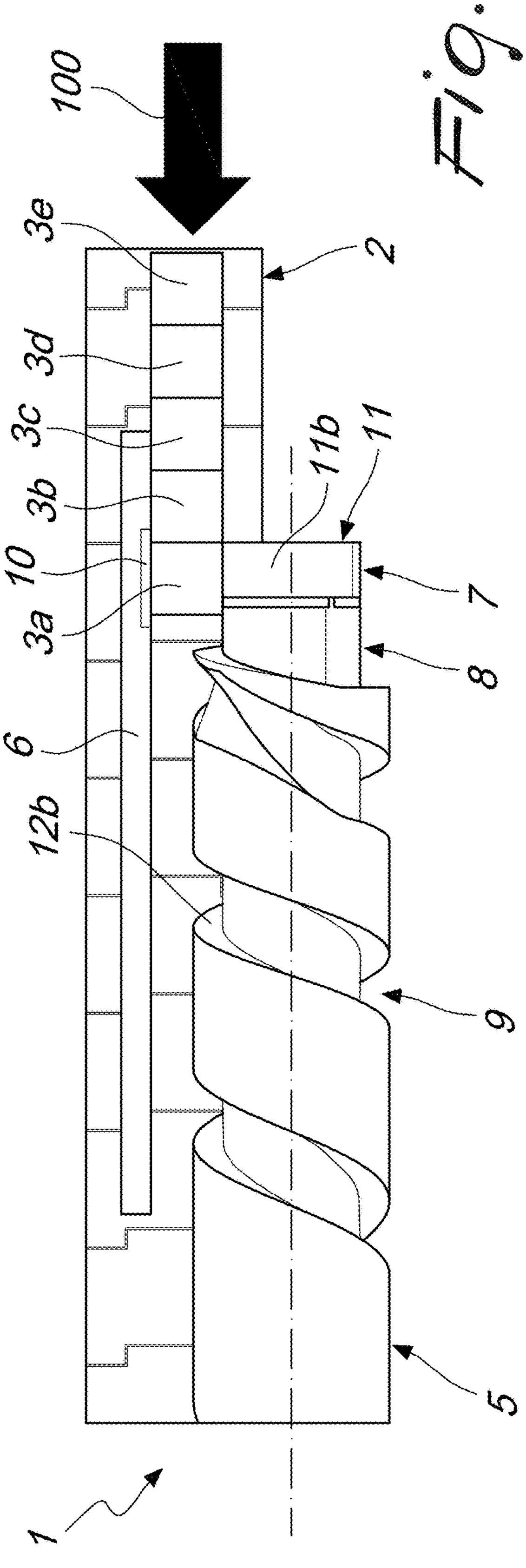
FIGS. 5 to 8 show a sequence of operating steps of the device according to the invention, seen in plan view from above.
Figure 6:
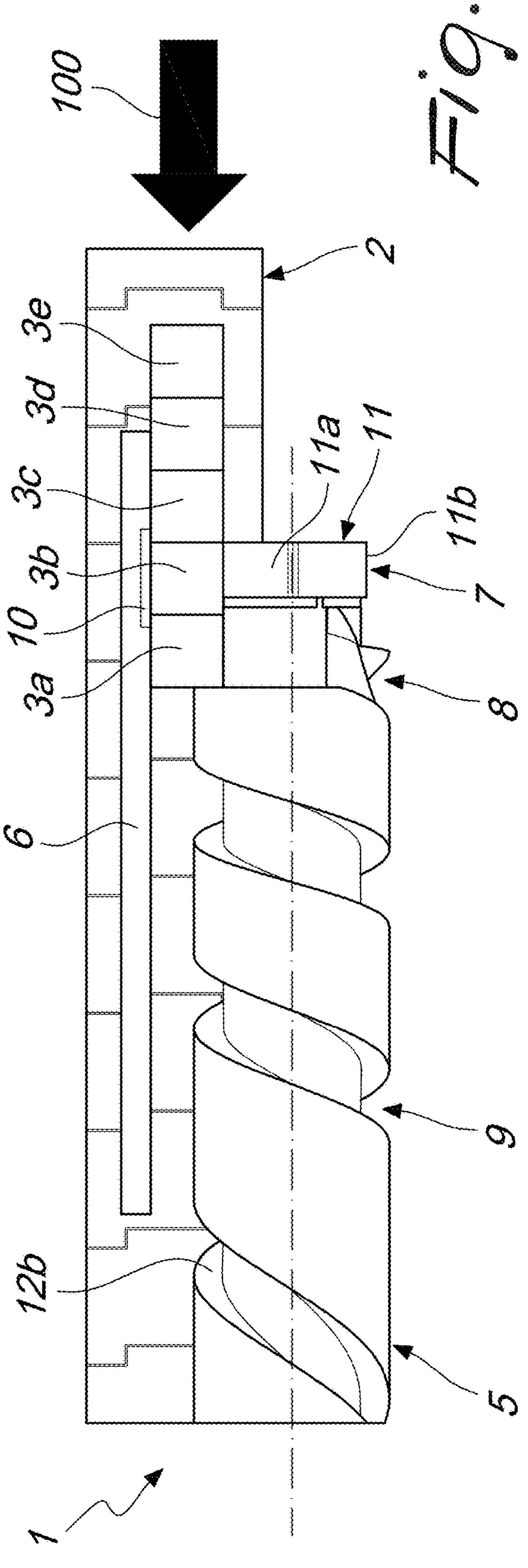
Figure 7:
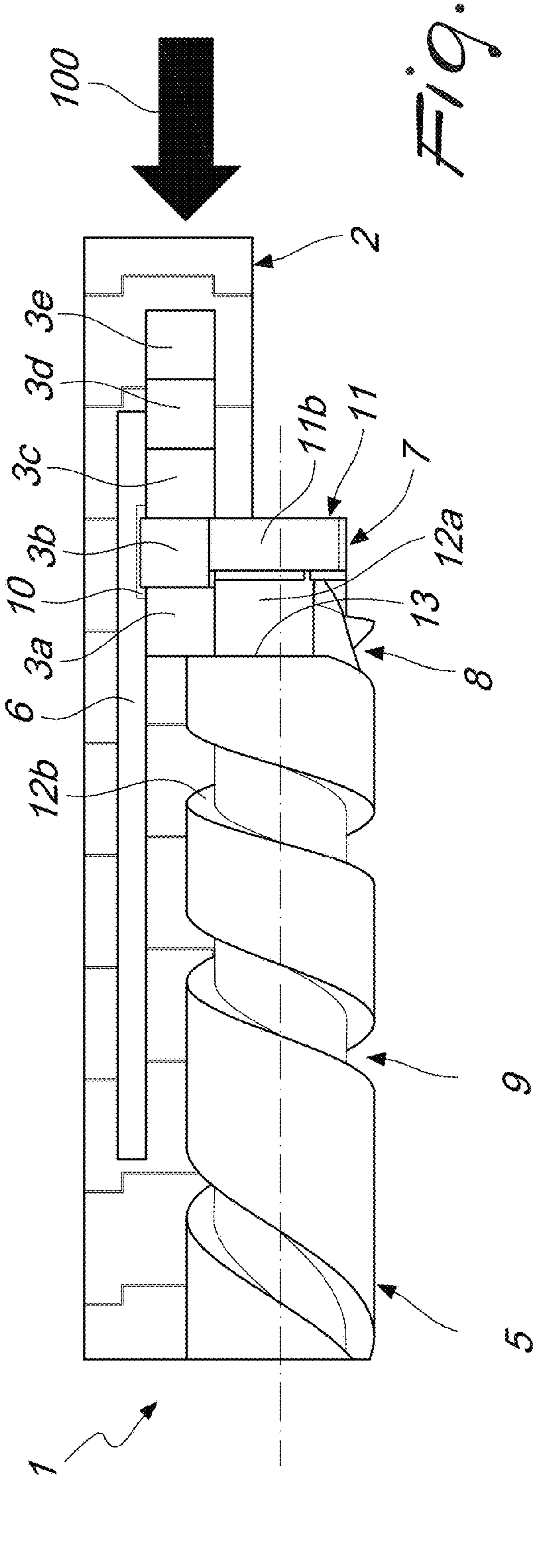
Figure 8:
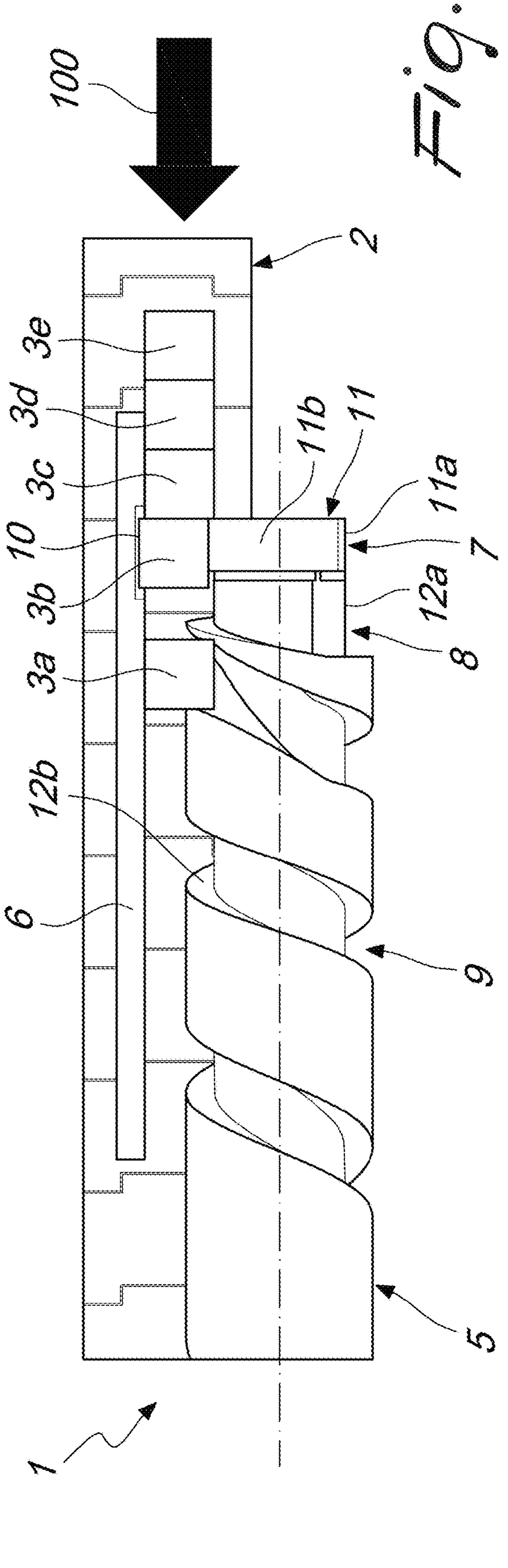

In detail, the access region 7 of the screw feeder 5 is structured so that it can pass, as a consequence of the rotation of the screw feeder 5 about its own axis, between at least one open condition, shown in particular in FIG. 6, in which it allows the containers to proceed in their advancement on the conveyor 2 and to pass through the access region, and at least one closed condition, shown for example in FIGS. 5, 7 and 8, in which the access region 7 is adapted to prevent, in cooperation with a contrast region 10, defined on the abutment wall 6, the advancement of the containers arriving at the screw feeder 5 on the conveyor 2 through the access region, resulting in a buildup of containers upstream of the screw feeder 5, along the advancement direction 100, and obtaining the immobilization of at least one of the containers, with respect to the abutment wall 6, by clamping it between the access region 7 and the contrast region 10.

It should be noted that the contrast region 10 has, advantageously, an abutment surface 10*a* that can be engaged via resting contact by the containers and which can be provided with a knurled portion, or be elastically movable toward or away from the screw feeder 5, if, for example, the device according to the invention is called on to process rigid containers.

For example, the contrast region 10 can be provided by a pan, elastically loaded by a spring, or by a body made of elastically yielding material, such as rubber or the like.

The accommodation region 8 of the screw feeder is, in turn, arranged downstream of the access region 7 along the direction of advancement 100 of the containers and is designed to receive, from the access region 7, when the latter is in the open condition, one container at a time, from the containers arriving on the conveyor 2, temporarily without allowing the container received from the access region 7 to advance further along the advancement direction 100.

The acceleration region 9 on the other hand is engaged by the containers after the accommodation region 8 and produces, on the container or containers engaged by it, a translation, as a consequence of the rotation of the screw feeder 5 about its own axis, in the same direction as the advancement direction 100 and at a higher speed than that imposed on the containers by the conveyor 2.

In more detail, it should be noted that, advantageously, the access region 7 of the screw feeder 5 comprises a cam-shaped region 11.

In particular, this cam-shaped region 11 has, around the axis of the screw feeder, at least one first portion 11*a* or open portion, which is designed to face the contrast region 10 when the access region 7 is in the open condition, and at least one second portion 11*b* or closed portion, which, in turn, is designed to face the contrast region 10 when the access region 7 is in the closed condition, and which has a lateral surface that extends farther from the axis of the screw feeder 5 than the lateral surface of the first portion 11*a*.

Conveniently, the second portion 11*b* of the cam-shaped region 11 has an angular extension, about the axis of the screw feeder 5, that is greater than that of the first portion 11*a*.

As illustrated, the screw feeder 5 further has, on its lateral surface, a groove 12 that extends in a spiral, about the axis of said screw feeder.

Conveniently, the groove 12 extends, in practice, starting from the accommodation region 8 and, more specifically, from a region located immediately downstream of the cam-shaped region 11 of the screw feeder 5, along the advancement direction 100, and extends substantially up to the end 5*b* of said screw feeder.

Advantageously, the groove 12 has, at the accommodation region 8, a first section 12*a* which has an extension with "dead" or zero pitch.

More specifically, the first section 12*a* of the groove 12 simply has an extension shaped like a circular arc about the axis of said screw feeder, which extends for an angle of preset breadth, less than 360°, with no component of extension along the axis of the screw feeder 5.

The first section 12*a* of the groove 12 is configured to be capable of accommodating a container arriving from the access region 7.

In more detail, the groove 12 has, at the first section 12*a*, an abutment surface 13, directed toward the access region 7 and against which the container that the first section 12*a* of the groove 12 receives from the access region 7 is pressed.

This abutment surface 13 lies, in particular, on a plane that is substantially perpendicular to the axis of the screw feeder 5, such that the container received by the accommodation region 8, while it is pressed against the abutment surface 13, with the screw feeder 5 in rotation about its own axis, does not undergo any translation along the axis of said screw feeder in the advancement direction 100 imposed by the conveyor 2.

Advantageously, the groove 12 has at least one second section 12*b*, which is in communication with the first section 12*a* and which extends, in turn, along the acceleration region 9.

Conveniently, the second section 12*b* of the groove 12 extends along a progressively increasing pitch, proceeding in the same direction as the advancement direction 100, so that the containers, by engaging the second section 12*b*, can undergo a progressive acceleration along the advancement direction 100.

The operation of the device according to the invention is the following.

A succession of containers 3*a*, 3*b*, 3*c*, 3*d* and 3*e* proceeds along the conveyor 2 while the screw feeder 5 is actuated to rotate about its own axis.

In particular, the containers 3*a*, 3*b*, 3*c*, 3*d*, 3*e* are conveniently arranged so as to present a first pair of mutually opposite flat faces along the advancement direction 100 and a second pair of mutually opposite flat faces along a direction that is transverse with respect to the advancement direction 100.

In practice, during the operation of the device, the access region 7 and the accommodation region 8 of the screw feeder 5 work alternately, so that every first container arriving at the screw feeder 5 can proceed along the screw feeder 5, in so doing entering the accommodation region 8 and becoming separated from the subsequent containers, while every second container arriving is held between the access region 7 in the closed condition and the contrast region 6.

In more detail, in a first step of the operation of the device, shown in FIG. 5, the access region 7 of the screw feeder 5 is in the closed condition, with the second portion 11*b* of the cam-shaped region 11 directed toward the contrast region 10.

In this first step, the first container 3*a* of the succession of containers 3*a*, 3*b*, 3*c*, 3*d*, 3*e* arriving at the screw feeder 5 on the conveyor 2 is clamped between the second portion 11*b* of the cam-shaped region 11 and the contrast region 10 on the abutment wall 6, while the other containers 3*b*, 3*c*, 3*d* and 3*e* in the succession, finding the access region 7 of the screw feeder 5 in the closed condition, accumulate upstream of said screw feeder.

In a second step of operation, subsequent to the first step and shown in FIG. 6, the access region 7 is in the open condition and, in particular, the first portion 11*a* of the cam-shaped region 11 is directed toward the contrast region 6.

In particular, in this second step, the first two containers 3*a*, 3*b* of the succession enter the screw feeder 5, passing through the space comprised between the open portion 11*a* of the cam-shaped region 11 and the contrast region 10, and the first container 3*a* is received by the accommodation region 8, being pressed against the shoulder constituted by the abutment surface 13 of the first section 12*a* of the groove 12 of the screw feeder 5, while the second container 3*b*, immediately after the first container 3*a*, is at the cam-shaped region 11.

In a third step of operation of the device according to the invention, after the second step and illustrated in FIG. 7, the access region 7 is in the closed condition and, in particular, the second portion 11*a* of the cam-shaped region 11 is directed toward the contrast region 10, so that the second container 3*b* in the succession is pressed against the abutment wall 6 by virtue of its being clamped between the second portion 11*b* of the cam-shaped region 11 and the contrast region 10.

In a fourth step of operation, after the third step and illustrated in FIG. 8, the first container 3*a* leaves the accommodation region 8, exiting from the first section 12*a* of the groove 12, and enters the acceleration region 9, being then engaged by the second section 12*b* of the groove 12, with the consequent separation of the first container 1*a* from the second container 1*b* along the advancement direction 100.

At this point the operation cycle is repeated for the other containers arriving at the screw feeder 5.

In practice it has been found that the invention fully achieves the intended aim and objects by providing a device for conveying and feeding containers for machines for processing containers that makes it possible to optimally execute the separation and regular spacing apart of contoured containers with substantially flat faces and a substantially polygonal transverse cross-section.

The invention thus conceived is susceptible of numerous modifications and variations, all of which are within the scope of the appended claims. Moreover, all the details may be substituted by other, technically equivalent elements.

In practice, the materials used, as well as the contingent shapes and dimensions, may be any according to the requirements and to the state of the art.

The disclosures in Italian Patent Application No. 102022000013597 from which this application claims priority are incorporated herein by reference.

Where technical features mentioned in any claim are followed by reference signs, those reference signs have been included for the sole purpose of increasing the intelligibility of the claims and accordingly, such reference signs do not have any limiting effect on the interpretation of each element identified by way of example by such reference signs.

The invention claimed is:

1. A device for conveying and feeding containers, particularly contoured containers with substantially flat faces and a substantially polygonal transverse cross-section, for machines for processing containers, which comprises a conveyor, which is adapted to move said containers along an advancement direction, and separation means, which are adapted to mutually space apart said containers along said advancement direction, wherein said separation means comprise a screw feeder, which is arranged substantially parallel to said advancement direction and can be actuated to rotate about an axis thereof, and at least one abutment wall, which is arranged so as to face a lateral surface of said screw feeder, said screw feeder having, along a longitudinal extension thereof, proceeding from one of ends thereof to another end in a same direction as said advancement direction, at least three regions configured to be engaged in sequence by said containers, respectively at least one access region, which is adapted to pass, as a consequence of a rotation of said screw feeder about the axis thereof, between at least one open condition, in which said access region allows said containers to proceed in their advancement on said conveyor, and at least one closed condition, in which said access region is adapted to prevent, in cooperation with a contrast region defined on said abutment wall, an advancement of the containers arriving at said screw feeder on said conveyor, with clamping of at least one container between said access region and said contrast region, at least one accommodation region, which is adapted to receive, from said access region in the open condition, one container at a time temporarily without allowing further advancement thereof, and an acceleration region which is adapted to produce, upon the rotation of said screw feeder about the axis thereof, a translation of the containers in a same direction as said advancement direction at a higher speed than that imposed on said containers by said conveyor.

2. The device according to claim 1, wherein said access region comprises a cam-shaped region.

3. The device according to claim 2, wherein said cam-shaped region has, around the axis of said screw feeder, at least one first portion, which is designed to face said contrast region with said access region in said open condition, and at least one second portion, which is designed to face said contrast region with said access region in said closed condition and which has a lateral surface that extends farther from the axis of said screw feeder than the lateral surface of said first portion.

4. The device according to claim 1, wherein said screw feeder has, on the lateral surface thereof, a spirally-extended groove, said groove having, at said accommodation region, a first section which has an extension with zero pitch.

5. The device according to claim 4, wherein said first section of said groove has a circular arc-like extension around the axis of said screw feeder.

6. The device according to claim 4, wherein said groove has, at said first section, an abutment surface, which is directed toward said access region and is designed to receive in resting contact therewith every container that arrives from said access region, said abutment surface lying on a plane that is substantially perpendicular to the axis of said screw feeder.

7. The device according to claim 4, wherein said groove has at least one second section, which communicates with said first section and extends along said acceleration region.

8. The device according to claim 7, wherein said second section of said groove extends along a progressively increasing pitch, proceeding in the same direction as said advancement direction.

9. The device according to claim 1, wherein said contrast region has an abutment surface which can be engaged in resting contact by the containers, said abutment surface being elastically movable toward or away from said screw feeder.

* * * * *